United States Patent [19]

Nishii

[11] Patent Number: 4,621,564
[45] Date of Patent: Nov. 11, 1986

[54] FORCE MULTIPLYING DEVICE FOR VEHICLE BRAKE SYSTEMS

[75] Inventor: Michiharu Nishii, Kariya, Japan
[73] Assignee: Aisin Seiki Kabushiki Kaisha, Japan
[21] Appl. No.: 655,157
[22] Filed: Sep. 27, 1984
[30] Foreign Application Priority Data Sep. 30, 1983 [JP] Japan .......................... 58-150514[U]

[51] Int. Cl.$^4$ ............................................. F01B 19/00
[52] U.S. Cl. ........................................ 91/534; 92/48;
92/169.3; 91/376 R
[58] Field of Search ................ 92/48, 165 PR, 169.3,
92/169.4; 91/534, 376 R; 60/547.1

[56] References Cited
U.S. PATENT DOCUMENTS

| 3,478,519 | 11/1969 | Eggstein ................................. 92/48 |
| 3,805,680 | 4/1974 | Weatherhogg ....................... 92/48 |
| 4,256,016 | 3/1981 | Thomas .............................. 92/169.3 |
| 4,330,996 | 5/1982 | Becht ..................................... 92/48 |
| 4,377,966 | 3/1983 | Parker et al. . |
| 4,433,614 | 2/1984 | Takeuchi ........................... 92/169.3 |
| 4,484,509 | 11/1984 | Belart ..................................... 92/48 |

FOREIGN PATENT DOCUMENTS 2009871A  6/1979  United Kingdom .
2111152A  6/1983  United Kingdom .

Primary Examiner—Abraham Hershkovitz
Attorney, Agent, or Firm—Finnegan, Henderson, Farabow, Garrett & Dunner

[57] ABSTRACT

A tandem type brake force multiplying device including a pair of diaphragms and a partition wall defining a pair of constant suction chambers and a pair of actuating or pressure variable chambers. The device has a shell comprised of a front, intermediate and rear housings which are formed with a plurality of sets of axially aligned sleeves through which force transmitting rods are passed. The reaction force from the brake master cylinder is therefore transmitted through these rods to the vehicle body. The sleeves define therein a pair of chambers, at least one of which is in communication with both the actuating chambers.

8 Claims, 8 Drawing Figures

FORCE MULTIPLYING DEVICE FOR VEHICLE BRAKE SYSTEMS

The present invention relates to a vehicle brake device and more particularly to a force multiplying device for a vehicle brake device. More specifically, the present invention pertains to a tandem type force multiplying device having a pair of axially arranged sleeves in which chambers are formed.

In vehicle brake systems, there have been widely used brake force multiplying devices or servo booster which utilizes engine intake suction pressures. Such force multiplying device include one or more pressure responsive movable elements such as diaphragms each defining a suction pressure chamber at one side and an actuating pressure or pressure variable chamber at the other side. A valve device is provided for alternately connecting the actuating pressure chamber to the suction pressure chamber and the atmosphere. When the actuating pressure chamber is opened to the atmosphere, the diaphragm is forced to move under the pressure difference between the two chambers and the movement of the diaphragm is transferred to a brake master cylinder to actuate the same with the brake pedal depressing force of an operator.

In efforts to decrease the total weight of the force multiplying device, it has been proposed to form the shell structure of the device with a synthetic resin material or make the shell structure with a thin wall. It should however be noted that the shell of the device is on one hand mounted on or secured to the vehicle body and on the other hand connected with a housing structure of the master cylinder to support the same so that the shell of the force multiplying device is subjected to a reaction force applied thereto from the brake master cylinder. The aforementioned shell structures of decreased weight may therefore have problems of deformations in use under such reaction force due to insufficient rigidity. In order to overcome the problem, there is proposed in the British patent disclosure No. 2,009,871A to provide force transmitting rods through the shells of the force multiplying devices so that the reaction forces as produced on the brake master cylinders are transmitted through these rods to the vehicle bodies. The proposed arrangements is however disadvantageous in that the force transmitting rods extend through movable elements such as diaphragms so that there must be provided sealing means between the rods and the movable elements. The proposed arrangement is therefrom complicated in structure, requires an increased number of parts and takes time and labor for assembling the same. Further, use of the sealing means produces a further problem of reliability.

In view of the disadvantages of the proposed arrangement, there has been made another proposal by the British patent disclosure No. 2,111,152A in which the shell of the force multiplying device is constituted by front and rear housings respectively having sleeves which are maintained in an abutting relationship and through which the force transmitting rods are passed. Such sleeve is formed integral with the housings and comprises a pair of opposed walls which are radially inwardly projected from the housing for defining a chamber therebetween and a connecting portion thereof at its inner ends, respectively. The force transmitting rods are passed through the connecting portions of the sleeves. The chamber formed in the sleeves is a closed room and not used at all for actuation of the brake booster. There has been made a further proposal in U.S. Pat. No. 4,377,966 in which a servo booster has a front and rear housings, an intermediate housing located therebetween and having a partition wall, and movable walls in the housings for defining constant pressure chambers and pressure variable chambers. In this case, a first and second bellows are arranged co-axially around each tie rod and connected to the front housing and the movable wall and the partition wall and another movable wall, respectively. The interior of the bellows communicates with the actuating pressure chambers. In other words, the interior of the bellows is utilized for communication with both the actuating pressure chambers. However, the sleeves integral with the housings are not used in this prior art.

It is therefore an object of the present invention to provide a tandem type force multiplying device having force transmitting rod means passing through sleeve means which are radially inwardly projected from the inner peripheries of the housings and have chambers therein.

Another object of the present invention is to provide a tandem type brake force multiplying device having force transmitting means passing through the shell but not through the pressure responsive movable elements.

A further object of the present invention is to provide a tandem type brake force multiplying device which is light in weight, simple in structure and easy and inexpensive in manufacture.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

According to the present invention, as embodied and broadly described herein, the above and other objects can be accomplished by a brake force multiplying device comprising a shell which includes a first end housing, a second end housing and an intermediate housing disposed between the first and second end housings, the intermediate housing having partition wall means dividing the interior of the shell into a first and second compartments, a first pressure responsive element provided between the first end housing and the intermediate housing to divide the first compartment into a first constant pressure chamber and a first actuating pressure chamber, a second pressure responsive element provided between the intermediate housing and the second end housing to divide the second compartment into a second constant pressure chamber and a second actuating pressure chamber which are arranged in the same sequence as the sequence in which the first constant pressure chamber and the first actuating chamber are arranged, means for connecting the first and second constant pressure chambers with pressure source means, valve means for connecting the first and second actuating pressure chambers alternately with the constant pressure chambers and the atmosphere, the first and second end housings having axially aligned sleeve means, the intermediate housing having intermediate sleeve means which is disposed between and in abutting relationship with the sleeve means in the first and second end housings, a force transmitting rod means passing through the sleeve means in the first and second end housings and the intermediate sleeve means in the intermediate housing, said sleeve means having formed therein a pair of first and second auxiliary chambers divided by said partition wall means on the intermediate housing, at least one of said auxiliary chambers providing communication between said constant pressure chambers or actuating pressure chambers.

In a preferable aspect of the present invention, the sleeve means in the first end and second end and intermediate housings are formed to be positioned radially inwardly of the peripheries of the housings. The sleeve means each comprises a pair of opposed walls, which are inwardly radially projected from the inner periphery of the housing, and a connecting portion of the opposed walls. The chamber in each sleeve means is located between the opposed walls, and the force transmitting rod means passes through the connecting portion of the sleeve means. The first auxiliary chamber in the sleeve means of the first end and intermediate housings is in communication with the constant pressure chambers. Alternatively, the second auxiliary chamber in the sleeve means of the second end and intermediate housings is in communication with the actuating pressure chambers.

In another aspect of the present invention, the first and second pressure responsive elements are in the form of flexible diaphragms having inner peripheries secured to power piston means, the first pressure responsive element having an outer periphery held between the first end housing and the intermediate housing, the second pressure responsive element having an outer periphery held between the second end housing and the intermediate housing. The partition wall means on the intermediate housing may have an inner periphery slidably engaged with said power piston means. The power piston may be biased in one direction by resilient spring means so that it is moved under the biasing force of the resilient spring means in said one direction when the first and second actuating pressure chambers are connected with the first and second constant pressure chambers but forced in the opposite direction when the first and second actuating pressure chambers are opened to the atmosphere.

According to the arrangement of the present invention, the shell of the force multiplying device is not required to support the reaction force applied thereto from the brake master cylinder but the reaction force is supported by the vehicle body through the force transmitting rod means. It will therefore be understood that the shell of the device can be of a light structure without having a risk of deformation in use. Further, according to the present invention, the housings are provided with sleeve means which have a pair of chambers for communication between either the constant pressure chambers or the actuating pressure chambers.

The accompanying drawings, which are incorporated in and constitute a part of this specification, illustrate embodiments of the invention and, together with the description, serve to explain the principles of the invention.

Figure 1:
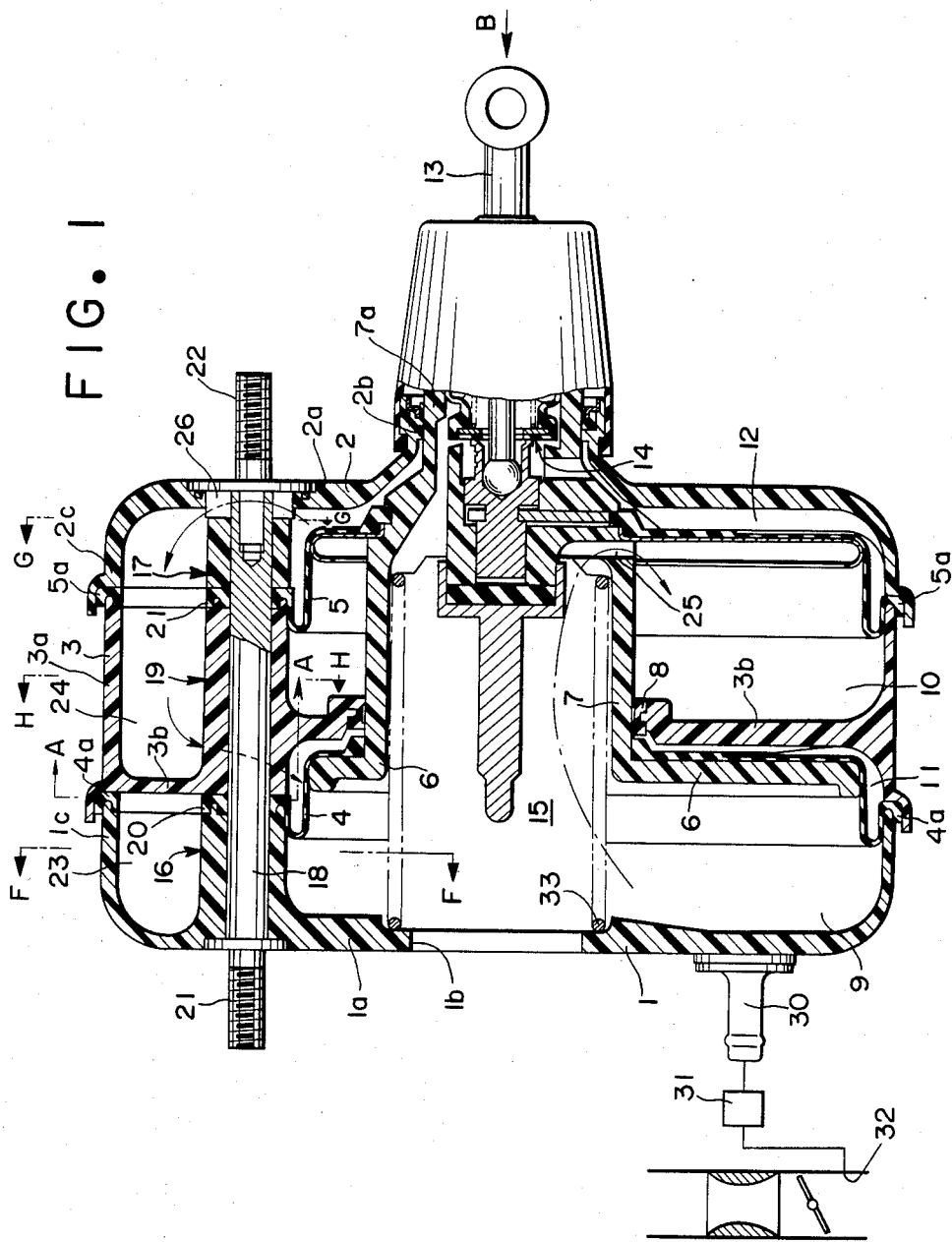
FIG. 1 is a sectional view of a brake force multiplying device constructed in accordance with one embodiment of the present invention, the section being taken along the line E—E in FIG. 3.

Referring now to the drawings, particularly to FIG. 1, there is shown a tandem type brake force multiplying device or a brake booster including a shell comprised of a front housing 1, a rear housing 2 and an intermediate housing 3. The front housing 1 has a front wall 1a formed with a central hole 1b and a peripheral wall 1c extending rearward from the outer periphery of the front wall 1a. The rear housing 2 has a rear end wall 2a having a central boss 2b and a peripheral wall 2c extending forward from the outer periphery of the rear end wall 2a. The intermediate housing 3 has a peripheral wall 3a disposed between and in abutting relationship with the peripheral walls 1c and 2c of the front and rear housings 1 and 2. The intermediate housing 3 is further formed with a partition wall 3b extending radially inwardly of the peripheral wall 3a. The partition wall 3b has an inner periphery slidably engaged through a seal 8 with a hollow power piston 6 at a cylindrical portion 7 formed on the piston 6. The piston 6 further has a cylindrical extension 7a extending rearward from the cylindrical portion 7 and slidably received by the cylindrical boss 2b in the rear end wall 2a of the rear housing 2. The housings 1, 2 and 3 and the power piston 6 are made of a suitable synthetic resin material.

Between the front housing 1 and the intermediate housing 3, there is a front diaphragm 4 having an outer periphery 4a held between the peripheral walls 1c and 3a of the front and intermediate housings 1 and 3, respectively. The inner periphery of the front diaphragm 4 is secured to the front end of the cylindrical portion of the power piston 6. Similarly, a rear diaphragm 5 is disposed between the rear and intermediate housings 2 and 3, and has an outer periphery 5a held between the peripheral walls 2c and 3a of the rear and intermediate housings 2 and 3, respectively. The inner periphery of the rear diaphragm 5 is secured to the power piston 6 at the rear end of the cylindrical portion 7 thereof. It will therefore be noted that the front diaphragm 4 defines a front constant pressure chamber 9 with the front end wall 1a of the front housing 1 and a front actuating pressure chamber 11 with the partition wall 3b of the intermediate housing 3. The rear diaphragm 5 defines a rear constant pressure chamber 10 with the partition wall 3b and a rear actuating pressure chamber 12 with the rear end wall 2a of the rear housing 2.

The front and rear constant pressure chambers 9 and 10 are connected together through a passage 25 formed at the rear end of the cylindrical portion 7 and a central passage 15 formed in the hollow interior of the power piston 6. Further, the front end wall 1a of the front housing 1 is provided with a connection 30 which connects the front constant pressure chamber 9 with a check valve 31 which is in turn connected with an intake passage 32 of an engine. It will therefore be understood that the chambers 9 and 10 are maintained at a certain suction pressure.

In the cylindrical extension 7a of the power piston 6, there is provided a valve mechanism 14 of a known structure which is actuated by a control rod 13 to connect the chamber 12 alternately with the central passage 15 in the power piston 6 or with the atmosphere. The power piston 6 is biased rightward as seen in the plane of FIG. 1 by means of a spring 33.

Figure 6:
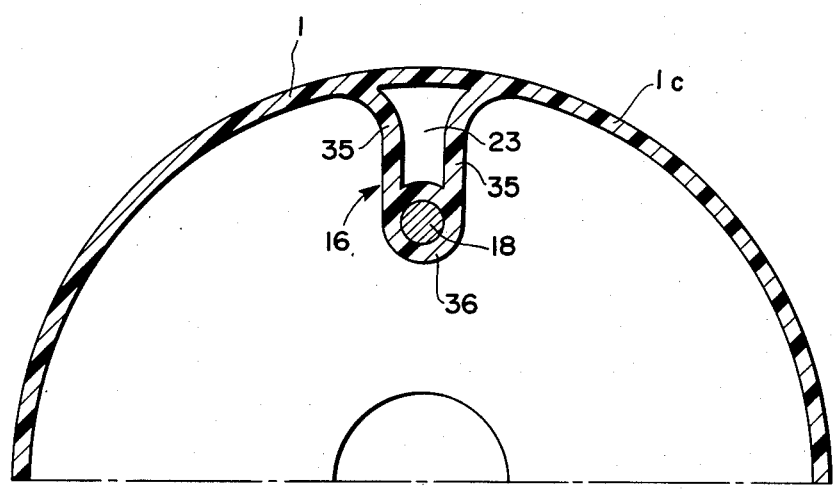
FIG. 6 is a fragmentary sectional view taken along the line F—F in FIG. 1 for showing the sleeve means of the front housing.
Figure 7:
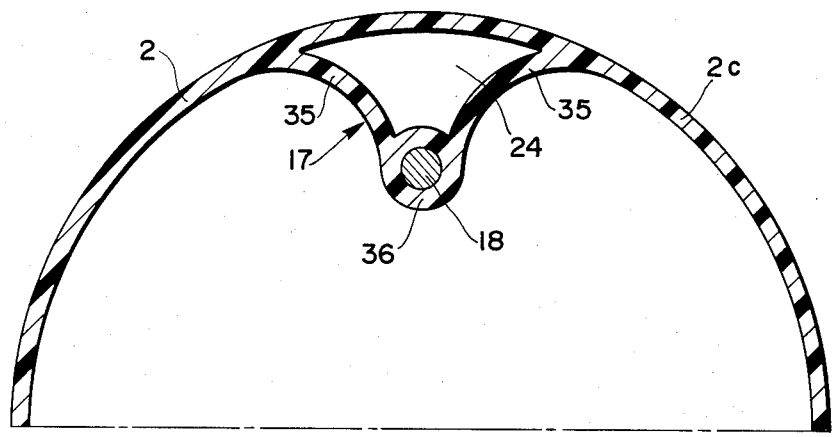
FIG. 7 is a fragmentary sectional view taken along the line G—G in FIG. 1 for showing the sleeve means of the rear housing.
Figure 8:
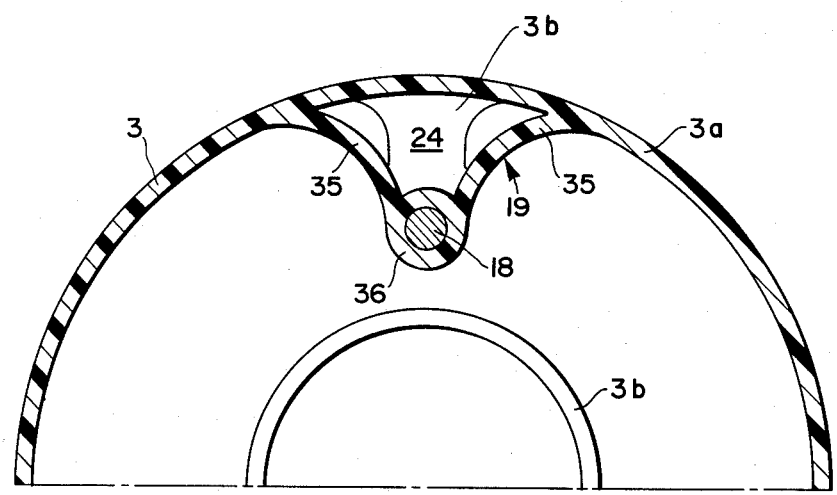
FIG. 8 is a fragmentary sectional view taken along the line H—H in FIG. 1 for showing the sleeve means of the intermediate housing.

The front end wall 1a of the front housing 1 is formed at diametrically opposite positions with a pair of rearwardly extending sleeves 16, although only one is shown in FIG. 1. Similarly, the rear end wall 2a of the rear housing 2 is formed at diametrically opposite positions with a pair of forwardly extending sleeves 17. The partition wall 3b of the intermediate housing 3 is formed at diametrically opposite positions with a pair of axially extending sleeves 19. The sleeves 16 and 17 are axially aligned with the sleeves 19 interposed therebetween. As shown in FIGS. 6-8, each sleeve (16, 17, or 19) comprises opposed walls (35) and a connecting portion (36) for receiving a force transmitting rod (18). The opposed walls (35) define auxiliary chambers (23, 24) in the sleeves (16, 17, 19).

Figure 2:
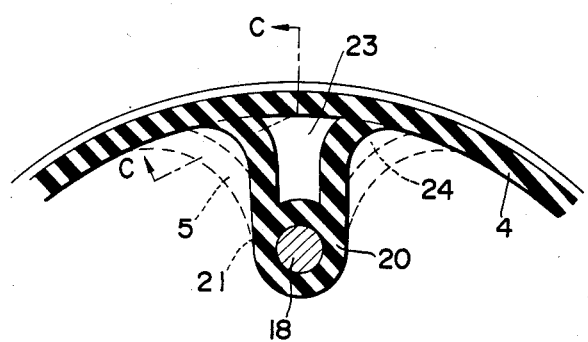
FIG. 2 is a fragmentary sectional view taken along the line A—A in FIG. 1.

As shown in FIG. 2, the front diaphragm 4 is formed with radially inwardly extending portions 20 which correspond in cross section to the sleeve 16 and which are held between the sleeves 16 and 19 formed respectively on the front housing 1 and the intermediate housing 3. As shown in FIG. 2, the portion 20 on the front diaphragm 4 also defines an auxiliary chamber 23.

Figure 4:
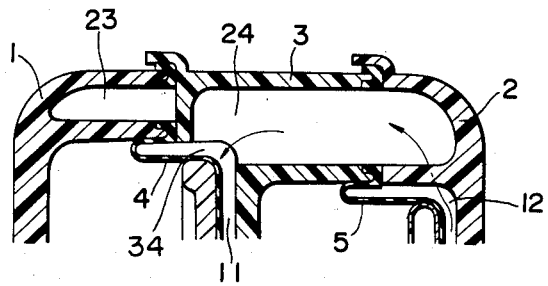
FIG. 4 is a fragmentary sectional view taken along the line C—C in FIG. 2.
Figure 3:
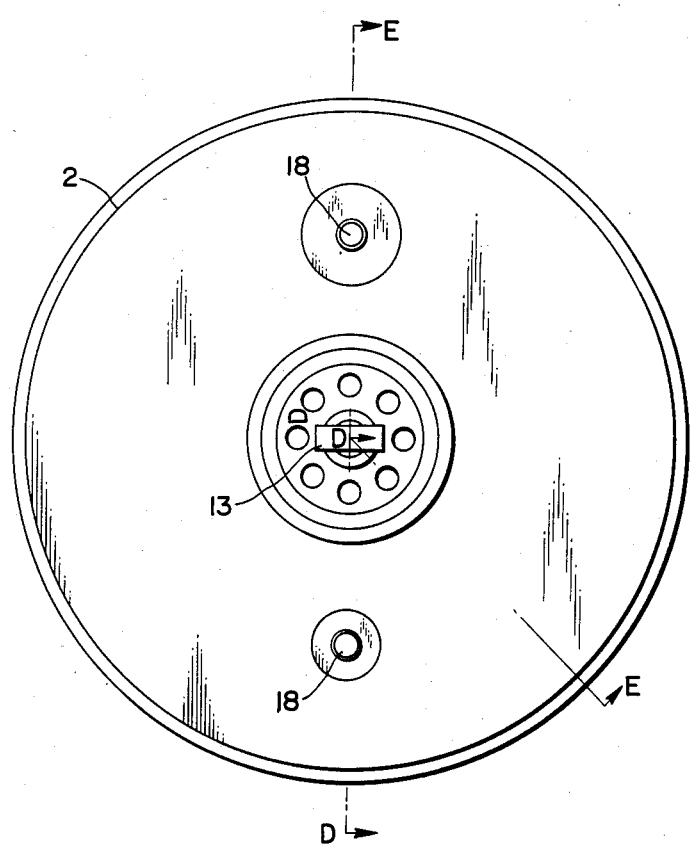
FIG. 3 is an end view as seen in the direction of the arrow B in FIG. 1.

The rear diaphragm 5 is formed with radially inwardly extending portions 21, one of which is shown by dotted lines in FIG. 2, so as to be held between the sleeves 17 and 19 as shown in FIG. 1. The configuration of the portion (21) is identical to those of the sleeves (17, 19) in cross-section. In FIG. 2, it will be noted that the portion 21 on the rear diaphragm 5 also defines an auxiliary chamber 24. The rear end wall 2a of the rear housing 2 is formed adjacent to the sleeve 17 with a passage 26 connecting the chamber 12 with each auxiliary chamber 24 as shown in FIG. 1. Further, as shown in FIG. 4, the intermediate housing 3 is formed with a passage 34 connecting the chamber 11 with each auxiliary chamber 24. It will therefore be understood that the chambers 11 and 12 are connected together through the passage 34, the auxiliary chamber 24 and the passage 26.

Through each set of the axially aligned sleeves 16, 19 and 17, there is passed the force transmitting rod 18. At one end of the rod 18, a stud 21 is screwed or integrally formed with the rod (18) and, at the other end a stud 22 is screwed. The studs 21 and 22 have flanges so that the housings 1, 2 and 3 are held together by these studs. The front stud 21 is for connection with the housing of a brake master cylinder (not shown) and the rear stud 22 is for connection with the vehicle body (not shown).

In operation, the valve 14 normally connects the chamber 12 with the central passage 15 in the power piston 6 so that a suction pressure is introduced from the chamber 9 through the passage 15 to the chamber 12 and then through the auxiliary chamber 24 to the chamber 11. Thus, the pressures in all chambers 9, 10, 11 and 12 are equalized and the power piston 6 is therefore shifted rightward as shown in FIG. 1. When the control rod 13 is actuated, the valve 14 opens the chamber 12 to the atmosphere as well known in the art so that the atmospheric pressure is introduced into the chamber 11 through the auxiliary chambers 24 to thereby force the power piston 6 leftward. At this time, the communication of the constant pressure chambers (9, 10) and the actuating pressure chamber (11, 12) is interrupted.

The movement of the power piston 6 is transmitted to the brake master cylinder in a conventional manner. The reaction force from the master cylinder is supported by and transmitted through the rods 18 so that the shell is not subjected to any reaction force. Although, there are two auxiliary chambers (24), one of them may be used to introduce the atmospheric pressure into the actuating pressure chamber (11). In this case, another sleeve, which is not used for communication of both the actuating pressure chambers (11, 12), is provided with only a portion for receiving the force transmitting rod, but not the auxiliary chamber. For example, a solid type sleeve may be provided for this purpose.

Figure 5:
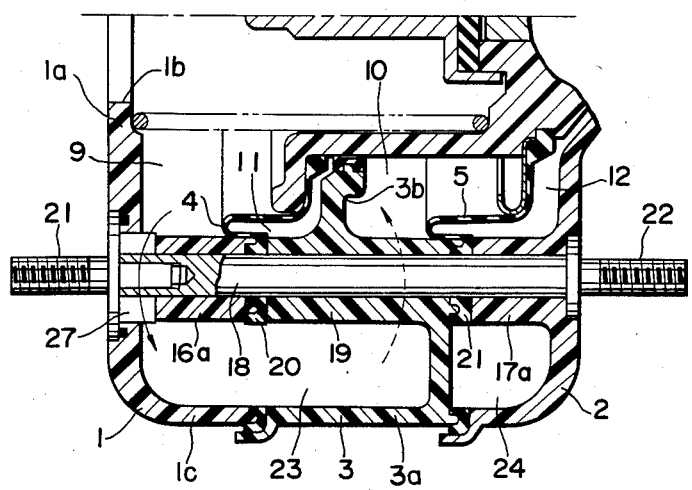
FIG. 5 is a sectional view showing another embodiment of the present invention.

In the embodiment shown in FIG. 5, the passage 25 in the previous embodiment is omitted and instead the front constant pressure chamber 9 communicates with each auxiliary chamber 23 through a passage 27 formed in the front end wall 1a of the front wall 1. The auxiliary chamber 23 is turn communicated with the rear constant pressure chamber 10 through a passage (not shown) formed in the intermediate housing 3. Of course, only one of the auxiliary chambers (23) may be used for communication between both the constant pressure chambers (9, 10).

The invention has thus been shown and described with reference to specific embodiments, however, it should be noted that the invention is in no way limited to the details of the illustrated structures but changes and modifications may be made without departing from the scope of the appended claims.

What is claimed is:

1. A brake force multiplying device comprising a shell which includes a first end housing, a second end housing and an intermediate housing disposed between the first and second end housings, said intermediate housing having partition wall means dividing the interior of the shell into first and second compartments, a first pressure responsive element provided between the first end housing and the intermediate housing to divide the first compartment into a first constant pressure chamber and a first actuating pressure chamber, a second pressure responsive element provided between the intermediate housing and the second end housing to divide the second compartment into a second constant pressure chamber and a second actuating pressure chamber which are arranged in the same sequence as the sequence in which said first constant pressure chamber and said first actuating chamber are arranged, means for connecting said first and second constant pressure chambers with pressure source means, valves means for connecting said first and second actuating pressure chambers alternatively with said constant pressure chambers and the atmosphere, said first and second end housings having axially aligned sleeve means, said intermediate housing having intermediate sleeve means which is disposed between and in abutting relationship with the sleeve means in the first and second end housings, a force transmitting rod means passing through the sleeve means in the first and second end housings and the intermediate sleeve means in the intermediate housing, said sleeve means having formed therein first and second auxiliary chambers divided by said partition wall means of the intermediate housing, at least one of said auxiliary chambers providing communication between said constant pressure chambers or actuating pressure chambers.

2. A device in accordance with claim 1 in which said sleeve means in the first end, second end and intermediate housings are positioned radially inwardly of the peripheries of the housings.

3. A device in accordance with claim 2 in which each sleeve means comprises a pair of opposed walls, which are inwardly radially projected from the inner periphery of the housing, and a connecting portion where the opposed walls connect, said chamber in each sleeve means being located between the opposed walls and said force transmitting rod means passing through the connecting portion.

4. A device in accordance with claim 1 in which said second auxiliary chamber is formed in said sleeve means of the second end and intermediate housings and is in communication with the actuating pressure chambers.

5. A device in accordance with claim 1 in which said first and second pressure responsive elements are flexible diaphragms having inner peripheries secured to power piston means, the first pressure responsive element having an outer periphery held between the first end housing and the intermediate housing, the second pressure responsive element having an outer periphery held between the second end housing and the intermediate housing.

6. A device in accordance with claim 5 in which said partition wall means of the intermediate housing has an inner periphery slidably engaged with said power piston means.

7. A device in accordance with claim 5 which further includes resilient biasing means for applying a biasing force to the power piston means in one direction so that it is moved under the biasing force of the resilient spring means in said one direction when the first and second actuating pressure chambers are connected with the first and second constant pressure chambers but forced in the opposite direction when the first and second actuating pressure chambers are opened to the atmosphere.

8. A brake force multiplying device comprising a shell which includes a first end housing, a second end housing and an intermediate housing disposed between the first and second end housings, said intermediate housing having partition wall means dividing the interior of the shell into first and second compartments, a first pressure responsive element provided between the first end housing and the intermediate housing to divide the first compartment into a first constant pressure chamber and a first actuating pressure chamber, a second pressure responsive element provided between the intermediate housing and the second end housing to divide the second compartment into a second constant pressure chamber and a second actuating pressure chamber which are arranged in the same sequence as the sequence in which said first constant pressure chamber and said first actuating chamber are arranged, means for connecting said first and second constant pressure chambers with pressure source means, valve means for connecting said first and second actuating pressure chambers alternatively with said constant pressure chambers and the atmosphere, said first and second end housings having axially aligned sleeve means, said intermediate housing having intermediate sleeve means which is disposed between and in abutting relationship with the sleeve means in the first and second end housings, a force transmitting rod means passing through the sleeve means in the first and second end housings and the intermediate sleeve means in the intermediate housing, said sleeve means forming first and second auxiliary chambers divided by said partition wall means of the intermediate housing, said first auxiliary chamber being formed by the sleeve means of the first end and intermediate housings and providing communication between the constant pressure chambers.

* * * * *